United States Patent Office 3,269,897
Patented August 30, 1966

3,269,897
ENDRIN STABILIZED WITH TRIBENZYLAMINE
Arthur W. Carlson, Crystal Lake, Ill., assignor to Velsicol Chemical Corporation, Chicago, Ill., a corporation of Illinois
No Drawing. Filed Feb. 20, 1963, Ser. No. 260,050
9 Claims. (Cl. 167—33)

The present invention relates to new stable insecticidal compositions containing endrin and to the method of their preparation. This invention is particularly concerned with stabilized endrin compositions which can be readily formulated without undesirable auxiliary effects.

Endrin is the accepted name for the chemical 6,7-epoxy-1,2,3,4,10,10-hexachloro - 1,4,4a,5,6,7,8,8a - octahydro-1,4,5,8 - endo, endo-dimethanonaphthalene. As used herein it includes the normal commercial product which will contain a minimum of about 95 weight percent of the pure compound, the remainder being materials formed during the manufacturing processing.

In the past in has become well established that endrin is a broad spectrum insecticide of significant commercial importance. Unfortunately, as has been previously disclosed, it is known that endrin is somewhat unstable and that during storage it will convert to insecticidally inactive compounds.

Thus, in order to maintain its commercial importance it is necessary to employ in combination with endrin a stabilizer therefor. Numerous compounds have been suggested for this purpose with varying effectiveness as a stabilizer.

In the actual application of insecticidal compositions, particularly crystalline materials such as endrin, it is necessary to formulate the active components so as to permit adequate dispersion of the insecticide and the resulting maximum effective use thereof. Unfortunately, it has been found that in the preparation of these formulations using a substantial number of additives proposed as effective stabilizers, undesirable effects are obtained by the mixing of the components of the formulation with the stabilized endrin, effects caused by interaction of the stabilizer and the other ingredients of the formulation.

These adverse side reactions seriously hamper the application of the endrin containing formulation and its marketability. Not only is the precipitate or sludge formed by reaction of the deactivator objectionable from the viewpoint of appearance, but it causes serious and often fatal problems particularly the clogging of the application equipment.

It is, therefore, an object of the present invention to provide a means for the stabilization of endrin. More particularly it is an object of the present invention to create a procedure for the stabilization of endrin which will cause no undesired auxiliary effects.

Further, it is an object of the present invention to devise stabilized formulations of endrin.

Especially it is an object of the present invention to create emulsifiable concentrated endrin mixtures which are virtually completely free of precipitate.

These and other objects of the present invention can be accomplished by the ensuing procedure.

It has now been found that the undesired deterioration of endrin can be prevented without the formation of undesired side reactions and resulting precipitates and sludges by using as the stabilizer for the endrin an effective amount of tribenzylamine (referred to as TBA). By the use of this specific material as the stabilizer for endrin it has been unexpectedly found that the endrin not only will not decompose during storage or application but will contain no precipitate even after formulation.

As previously mentioned, most materials having practical utility for this purpose have the unfortunate characteristic of forming undesired byproducts particularly when the endrin is formulated as is generally necessary prior to its ultimate application. This latter effect is especially pronounced during the production of emulsifiable concentrates of endrin since in their formation there is necessarily employed emulsifiers. Generally, the preferred emulsifiers contain as an essential ingredient either a calcium or a magnesium alkyl aryl sulfonate. While other emulsifiers are available, the emulsifiers of this classification have especially fine emulsification properties which make them preferable commercial articles.

By an emulsifier containing a calcium or magnesium alkyl aryl sulfonate it is understood that this means that the emulsifiers can and normally do contain other ingredients since most commercially used emulsifiers are a blend of various ingredients. In these mixed emulsifiers the calcium or magnesium sulfonate is an anionic active agent. Since these materials are special blends the variety of components is large as is the specific proportions of the ingredients. The commercially available emulsifiers are sold under the trademark of the manufacturer, who generally jealously guards the make-up of his emulsifier from the world. Accordingly, it is not possible to define these materials with precision other than as to the overall type or classification and certain ingredients thereof determined by arduous analysis or from the limited amount of information supplied by the manufacturer. For the purpose of the present invention it is only necessary that the emulsifier contain as an active ingredient calcium or magnesium, usually as the sulfonate, which generally are present as a calcium or magnesium alkyl aryl sulfonate. It is this component which causes the undesired sludge or precipitate when in contact with many of the materials proposed as endrin stabilizers.

In accordance with the present invention endrin is contacted with a stabilizing amount of tribenzylamine. Since both materials occur as solids at room temperature, this can readily be performed by mixing the endrin and the tribenzylamine in standard blending equipment.

No difficulty has been incurred in obtaining uniform distribution of the tribenzylamine by dry blending techniques and therefore no need exists for using other more complicated procedures such as by the use of solutions, although they can be employed. Accordingly, adequate incorporation of the tribenzylamine is accomplished by the simplest of known procedures.

Extremely small quantities of tribenzylamine have been found to accomplish the requisite effect. For example, quantities of tribenzylamine as low as 0.01 weight percent of the endrin are quite effective in producing a stable endrin product. Naturally the term "stable" is somewhat relative, since it will depend on the conditions of storage and use, as well as the amount of product degradation which is tolerable. While as indicated above, as low as about 0.01 weight percent tribenzylamine will be suitable for effective stabilization, in certain instances where more extreme conditions may be encountered by the endrin it can be suitable to use at least about 0.05 weight percent based on the endrin content. No practical advantage is obtained by using excessive amounts of tribenzylamine for the present purpose, although amounts up to about 0.25 weight percent can be used to insure against the most extreme adverse conditions and for prolonged storage times.

In order to determine the stabilization of endrin by the incorporation of tribenzylamine the following experiments were performed:

*Example 1*

A solution of endrin (10.0 grams; 97% assay) dissolved in hexane was added to a solution (2 ml.) of tribenzylamine (0.02 gram) dissolved in pentane. After the addition the solvent was removed from the solution and the residue further stripped under a pressure of fifteen millimeters of mercury for ten minutes. The residual solid from this operation was powdered and the powdered material was placed into two jars. One of the capped jars was placed in an oven held at a temperature of 120° F., and the second jar was placed in an oven held at a temperature of 200° F. In order to have a control on these experiments, endrin from the same batch (97% assay) but containing no additives was placed in two capped jars similar to those used for the endrin-tribenzylamine blends. The jars were kept in the ovens for fixed time periods at which times the percent endrin was determined by means of infrared analysis with the following results:

A. 120° F.

|  | Time (Months) | | | |
| --- | --- | --- | --- | --- |
|  | 0 | 2 | 3 | 9 |
| Endrin plus tribenzylamine, percent | 97 |  |  | 97 |
| Endrin, percent | 97 | 90 | 20 |  |

B. 200° F.

|  | Time (Months) | | |
| --- | --- | --- | --- |
|  | 0 | 1 | 1½ |
| Endrin plus tribenzylamine, percent | 97 | 95 | 92 |
| Endrin, percent | 97 | 0 |  |

*Example 2*

Tribenzylamine (7.5 pounds) was added to endrin (4,800 pounds; 97% assay) and blended therewith for about one hour. At that time the product was drummed and the drums analyzed for percent tribenzylamine. The percentage of tribenzylamine as determined by titration with perchloric acid in chloroform-dioxane was found to vary between 0.14 and 0.16 percent by weight. A sufficient sample of material was taken from a drum of the product which analyzed 0.16 weight percent tribenzylamine. Ten grams of this product was mixed with 10 grams of endrin used initially but which did not contain stabilizer so as to prepare a stabilized endrin product which contained 0.08 weight percent tribenzylamine. Five grams of the product (0.16% tribenzylamine) was mixed with 15 grams of the unstabilized endrin to prepare a product containing 0.04 weight percent tribenzylamine. Finally 3 grams of the stabilized endrin containing 0.16 weight percent were mixed with 21 grams of the original unstabilized endrin so as to prepare a stabilized endrin product containing 0.02 weight percent tribenzylamine. The bottles containing the respective samples were then placed in an oven held at a temperature of 200° F. At the end of 35 days they were analyzed for percent endrin as follows:

| Percent Tribenzylamine | Percent Endrin initial | Percent Endrin at 35 days |
| --- | --- | --- |
| 0.02 | 97.0 | 95.2 |
| 0.04 | 97.0 | 95.8 |
| 0.08 | 97.0 | 96.4 |

It can be readily observed that tribenzylamine is an extremely effective stabilizer, the temperature conditions used therein being quite extreme. Accelerated testing of the type is a good indicia of how a product will perform under the more normal and milder conditions of normal use. Here it can be seen that at a temperature of 120° F., no deterioration whatsoever was noticeable after 9 months. Even at the notoriously high temperature of 200° F. the stabilized product was substantially intact after a month at which time none of the unstabilized control was in existence.

In order to determine the characteristics of the emulsifiable concentrates prepared from the stabilized endrin product of the present invention, and from stabilized endrin products using other stabilizers, a series of experiments were performed to determine the amount of sludge, if any, obtained therefrom as follows:

*Example 3*

Endrin (20 grams; 97% assay) dissolved in a stock solution (80 ml.) was placed into each of 10 pear-shaped centrifuge tubes having 1.00 ml. graduated tips. The stock solution was composed of two emulsifiers, Sponto 221 (40 grams) and Sponto 217 (10 grams) dissolved in heavy aromatic naphtha solvent (730 grams). Sponto 221 and Sponto 217 are trademarks for emulsifiers of the anionic-nonionic class wherein a calcium alkyl aryl sulfonate is present as an anionic portion. Into each centrifuge tube was inserted 1.00 ml. of a solution of one of the amines listed below dissolved in a heavy aromatic naphtha, such that the amine constituted 0.20 weight percent of the endrin. After twenty four hours the tubes were centrifuged for identical time periods and the volumes of sludge in each tube were compared as follows:

| Amine: | Percent by volume of sludge |
| --- | --- |
| No amine | 0.05 |
| Tribenzylamine | 0.05 |
| Hexamethylenetetramine | 2.3 |
| Triethylamine | 4.0 |
| Tri-n-propylamine | 2.5 |
| Diethylamine | 5.0 |
| Morpholine | 3.0 |
| Benzylamine | 3.0 |
| Isopropylamine | 8.0 |
| Ethanolamine | 3.5 |

*Example 4*

The procedure used in Example 3 was repeated using varying amounts of tribenzylamine including relatively large amounts. The percentage of sludge formed was measured after 45 hours and found to be as follows:

| Percent tribenzylamine: | Percent by volume of sludge |
| --- | --- |
| 0.16 | 0.05 |
| 0.41 | 0.05 |
| 0.66 | 0.05 |
| 1.16 | 0.07 |
| 2.16 | 0.06 |

*Example 5*

The procedure of Example 3 was repeated using a variety of endrin products and determining the percentage of sludge two days after preparation of the mixture and after they have been centrifuged. (The endrin products containing tribenzylamine were prepared in accordance with the procedure of Example 2.)

| Percent tribenzylamine: | Percent by volume of sludge |
| --- | --- |
| 0 | 0.05 |
| 0.15 | 0.05 |
| 0.40 | 0.05 |
| 0.65 | 0.05 |
| 1.15 | 0.07 |
| 2.15 | 0.06 |

It should be noted that the amount of sludge formed from endrin stabilized with tribenzylamine is approximately equivalent to that obtained when using endrin containing no stabilizer. Since endrin containing no stabilizer lacks the desired stability requisites for many applications, this comparison is made solely to show that the tribenzylamine does not contribute to the formation of the undesired sludge. Furthermore, it can be readily observed that the amount of sludge formed when using other "amine" stabilizers is from about 45 to 160 times the volume of sludge formed when using tribenzylamine as the stabilizer.

The stabilized endrin product prepared in accordance with the present invention can be used by all of the methods available for the application of insecticides and can be formulated into wettable powders, granulars, dusts, solutions, etc., using the various inert carriers, liquid and solid, and the additives, i.e., stickers, wetting and dispersing agents, commonly required for the production of such materials.

As previously indicated, this present stabilized endrin product is particularly useful in the production of emulsifiable concentrates since it will not cause the formation of a sludge or precipitate of any type as is produced by stabilized endrin products containing other known stabilizers, including other known amine stabilizers. These emulsifiable concentrates can be prepared by the established procedure such as the following:

*Example 6*

Emulsifier was weighed into an Erlenmeyer flask and solvent added thereto. After swirling the flask to dissolve the emulsifier, endrin (20 grams) was added and the flask was placed on a hot plate and stirred to dissolve the endrin. A tribenzylamine solution (1 ml. containing 30 milligrams of TBA) was added and poured into the centrifuge tubes. In order to determine the sludge content the tubes were centrifuged 45 hours later. The specific emulsifiers, and solvents used and the resulting sludge contents were as follows:

| Emulsifier (grams) | Solvent (ml.) | Sludge percent by volume |
|---|---|---|
| Emcol 300X (3.5); Emcol H500X (1.5). | Heavy aromatic naphthalene (78) | <0.05 |
| Triton X172 (1.5); Triton X152 (3.5) | do | <0.05 |
| Atlox 3404 (3.0); Atlox 3403 (2.0) | do | <0.05 |
| Toximul H (1.0); Toximul L (4.0) | Heavy aromatic naphtha | <0.05 |
| Emcol H85X (5.0) | do | <0.05 |
| Makon 10 (5.0) | do | <0.05 |

Emcol is a trademark of the Witco Chemical Company who describe Emcol 85X, 300X and Emcol H500X as blends of oil soluble calcium sulfonates with polyoxyethylene ethers. Triton is the trademark of the Rohm and Haas Company who describe Triton X172 and Triton X152 as blends of alkyl aryl polyether alcohols with organic sulfonates. Atlox is the trademark of the Atlas Chemical Company for a series of nonionic-anionic emulsifiers composed of blends of polyoxyethylene derivatives and calcium alkyl aryl sulfonates. Toximul is the trademark of the Stepan Chemical Company. Toximul H and Toximul L are blends of calcium alkyl aryl sulfonates and polyglycol ethers. Makon is the trademark of the Stepan Chemical Company who describe Makon 10 as alkyl phenoxy polyoxyethylene ethanols.

All of these emulsifiers contain calcium. While in the foregoing examples emulsifiers containing calcium were employed to show the beneficial results obtained by using tribenzylamine as the stabilizer for endrin, magnesium-containing emulsifiers could have been equivalently utilized as they cause the same precipitate problem.

Furthermore, the present invention is not limited to the formulations shown in the foregoing examples as it is already known that endrin can be formulated into many other emulsifiable concentrates by varying the identity of the emulsifiers and solvents and the concentrations of the ingredients. See for example U.S. Patent No. 2,872,368 entitled "Emulsifiers and Toxicants Containing the Same." By means of the present invention stable endrin formulations can be obtained without the problem of sludge or other precipitate formation.

I claim:

1. A stabilized endrin composition which contains endrin and a stabilizing amount of tribenzylamine.

2. A stabilized endrin composition which contains an insecticidally toxic amount of endrin and a stabilizing amount of tribenzylamine.

3. A new composition of matter which comprises endrin and a minimum of about 0.01 weight percent thereof of tribenzylamine.

4. A composition of matter which comprises endrin in combination with tribenzylamine in a quantity from about 0.01 to 0.25 weight percent of the endrin.

5. An emulsifiable endrin concentrate which comprises endrin, endrin stabilizing amount of tribenzylamine, emulsifier and solvent therefor.

6. An emulsifiable concentrate which comprises endrin, tribenzylamine in an endrin stabilizing quantity, enert solvent therefor and emulsifier containing as an essential portion a metal selected from the group consisting of calcium and magnesium.

7. An emulsifiable concentrate which comprises endrin, tribenzylamine in an endrin stabilizing amount, an inert solvent therefor and an emulsifier containig as a component a sulfonate selected from the group consisting of calcium sulfonate and magnesium sulfonate.

8. An emulsifiable concentrate which comprises endrin, tribenzylamine in an endrin stabilizing amount, an inert solvent therefor, and an emulsifier containig as a component a sulfonate selected from the group consisting of calcium alkyl aryl sulfonate and magnesium alkyl aryl sulfonate.

9. An emulsifiable concentrate which comprises endrin, tribenzylamine in an endrin stabilizing quantity, an inert solvent therefor, and an emulsifier containing as a essential component calcium alkyl aryl sulfonate.

References Cited by the Examiner

UNITED STATES PATENTS

| | | | |
|---|---|---|---|
| 2,043,257 | 6/1936 | Missbach | 260—652.5 |
| 2,658,017 | 11/1953 | Marhofer | 167—30 |
| 2,768,181 | 10/1956 | Bellin et al. | 260—348 |
| 3,056,722 | 10/1962 | Trademan et al. | 167—33 |

JULIAN S. LEVITT, *Primary Examiner.*

GEORGE A. MENTIS, *Assistant Examiner.*